United States Patent
Ly et al.

(10) Patent No.: US 12,052,663 B2
(45) Date of Patent: Jul. 30, 2024

(54) DOWNLINK RECEPTION WITH C-WUS OPERATION

(71) Applicant: QUALCOMM Incorporated, San Diego, CA (US)

(72) Inventors: Hung Dinh Ly, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/397,623

(22) Filed: Aug. 9, 2021

(65) Prior Publication Data
US 2023/0043142 A1 Feb. 9, 2023

(51) Int. Cl.
*H04W 52/02* (2009.01)
*H04W 72/23* (2023.01)

(52) U.S. Cl.
CPC ... *H04W 52/0216* (2013.01); *H04W 52/0235* (2013.01); *H04W 72/23* (2023.01)

(58) Field of Classification Search
CPC ......... H04W 52/0216; H04W 52/0235; H04W 72/23; H04W 52/0206; H04W 52/0258; H04W 52/028; H04W 52/0229
See application file for complete search history.

(56) References Cited

U.S. PATENT DOCUMENTS

2020/0092814 A1* 3/2020 Zhou ............... H04L 1/1614
2020/0100179 A1* 3/2020 Zhou ............... G06F 1/3209
2020/0213941 A1* 7/2020 Mochizuki ........ H04W 52/0206
2020/0260304 A1* 8/2020 Zhou ..................... H04W 72/23
2020/0314745 A1* 10/2020 Yi .......................... H04W 72/23
2021/0120486 A1 4/2021 Onaka et al.
2023/0031360 A1* 2/2023 Zhang ............... H04W 72/1268

OTHER PUBLICATIONS

3GPP TSG RAN WG1 Meeting #78; R1-142925; Source: Fujitsu; Title: Discussion of on/off transitions and related procedures; Dresden, Germany, Aug. 18-22, 2014. (Year: 2014).*
3GPP TSG RAN WG1 Meeting #90; R1-1714117; Source: InterDigital,Inc.; Title: Remaining details of BWP, Prague, Czech Republic, Aug. 21-25, 2017 (Year: 2017).*
3GPP TSG-RAN WG1 Meeting #94bis; R1-1811127; Source: Apple Inc.;Title: Network-indication based Approaches for UE Power Saving, Chengdu, China, Oct. 8-12, 2018. (Year: 2018).*
International Search Report and Written Opinion—PCT/US2022/035543—ISA/EPO—Oct. 26, 2022.

* cited by examiner

*Primary Examiner* — Mohammed S Chowdhury
(74) *Attorney, Agent, or Firm* — Procopio, Cory, Hargreaves & Savitch LLP

(57) ABSTRACT

Method and apparatus for downlink reception with C-WUS operation. The apparatus receives a C-WUS configuration configuring the UE to activate at least one cell of a base station from an inactive mode. The apparatus monitors for at least a WUS occasion from the at least one cell of the base station in the inactive mode. At least one downlink resource occasion is associated with the at least one cell in the inactive mode. The apparatus receives, from the base station, an active time indication indicating an active time for the at least one cell of the base station.

27 Claims, 15 Drawing Sheets

DOWNLINK RECEPTION WITH C-WUS OPERATION

TECHNICAL FIELD

The present disclosure relates generally to communication systems, and more particularly, to a configuration for downlink reception with cell wake up signal (C-WUS) operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a cell wake up signal (C-WUS) configuration configuring the UE to activate at least one cell of a base station from an inactive mode. The apparatus monitors for at least a wake up signal (WUS) occasion from the at least one cell of the base station in the inactive mode. At least one downlink resource occasion is associated with the at least one cell in the inactive mode. The apparatus receives, from the base station, an active time indication indicating an active time for the at least one cell of the base station.

In an aspect of the disclosure, a method, a computer-readable medium, and an apparatus are provided. The apparatus may be a device at a base station. The device may be a processor and/or a modem at a base station or the base station itself. The apparatus transmits, to at least one user equipment (UE), a cell wake up signal (C-WUS) configuration configuring the at least one UE to activate at least one cell of the base station from an inactive mode. The apparatus monitors for at least a wake up signal (WUS) from the at least one UE. The at least one cell in the inactive mode associated with the base station having corresponding WUS occasions monitors for at least the WUS from the at least one UE. The apparatus transmits, to the at least one UE, an active time indication indicating an active time for the at least one cell of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
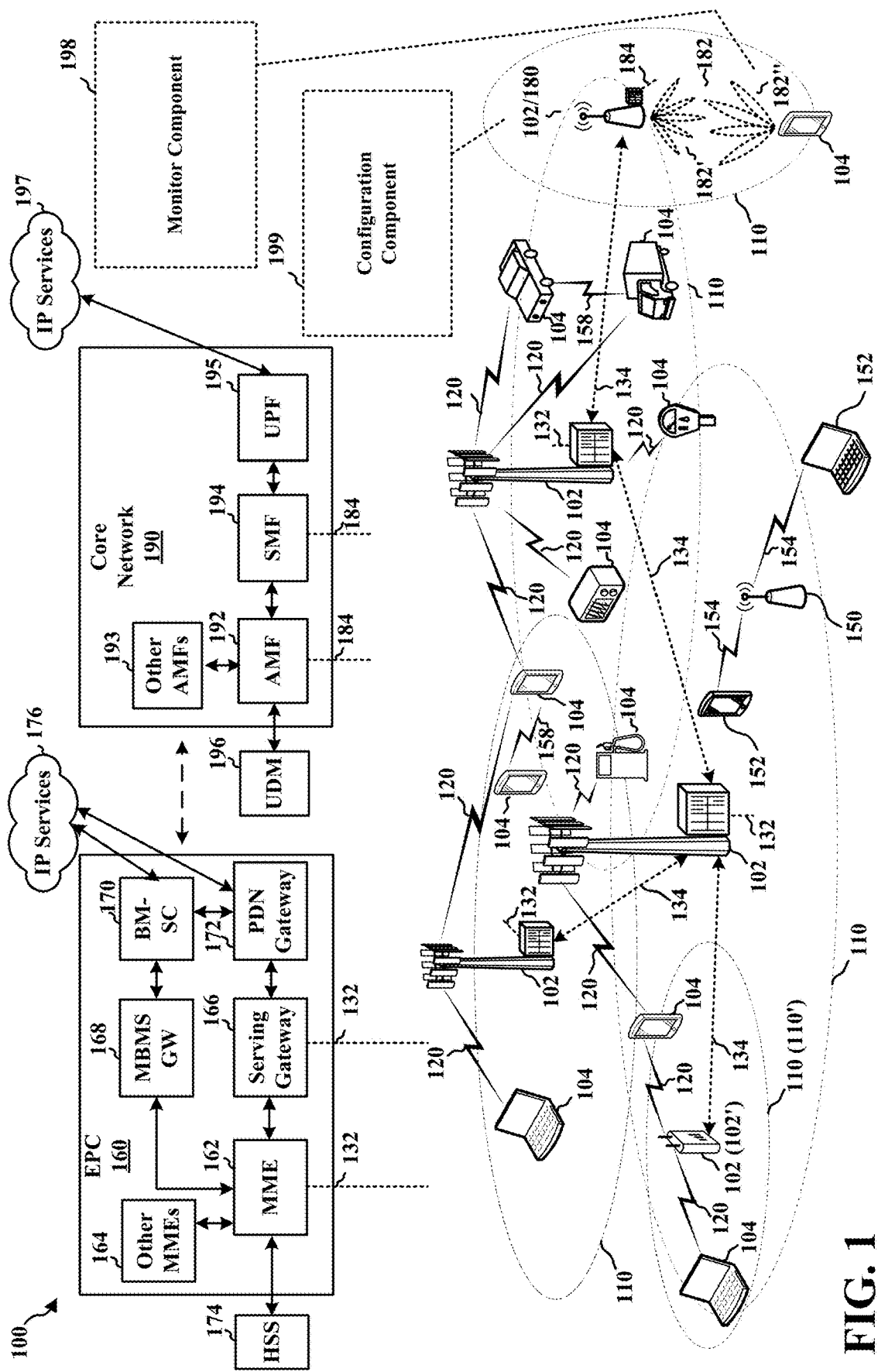
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to monitor for downlink resources while at least one cell of a base station is in an inactive mode. For example, the UE 104 may comprise a monitor component 198 configured to monitor for downlink resources while at least one cell of a base station is in an inactive mode. The UE 104 may receive a C-WUS configuration configuring the UE to activate at least one cell of a base station from an inactive mode. The UE 104 may monitor for at least a WUS occasion from the at least one cell of the base station while the at least one cell is in the inactive mode. At least one downlink resource occasion is scheduled for reception while the at least one cell is in the inactive mode. The UE 104 may receive, from the base station 180, an active time indication indicating an active time for the at least one cell of the base station.

Referring again to FIG. 1, in certain aspects, the base station 180 may be configured to configure a UE to monitor for downlink resources while at least one cell of the base station is in an inactive mode. For example, the base station 180 may comprise a configuration component 199 configured to configure a UE 104 to monitor for downlink resources while at least one cell of the base station is in an inactive mode. The base station 180 may transmit, to at least one UE 104, a C-WUS configuration configuring the at least one UE 104 to activate at least one cell of the base station 180 from an inactive mode. The base station 180 may monitor for at least a WUS from the at least one UE 104. At least one downlink resource occasion is scheduled for transmission to the at least one UE 104 while the at least one cell is in the inactive mode. The base station 180 may transmit, to the at least one UE 104, an active time indication indicating an active time for the at least one cell of the base station 180.

Although the following description may be focused on 5G NR, the concepts described herein may be applicable to other similar areas, such as LTE, LTE-A, CDMA, GSM, and other wireless technologies.

Figure 2:
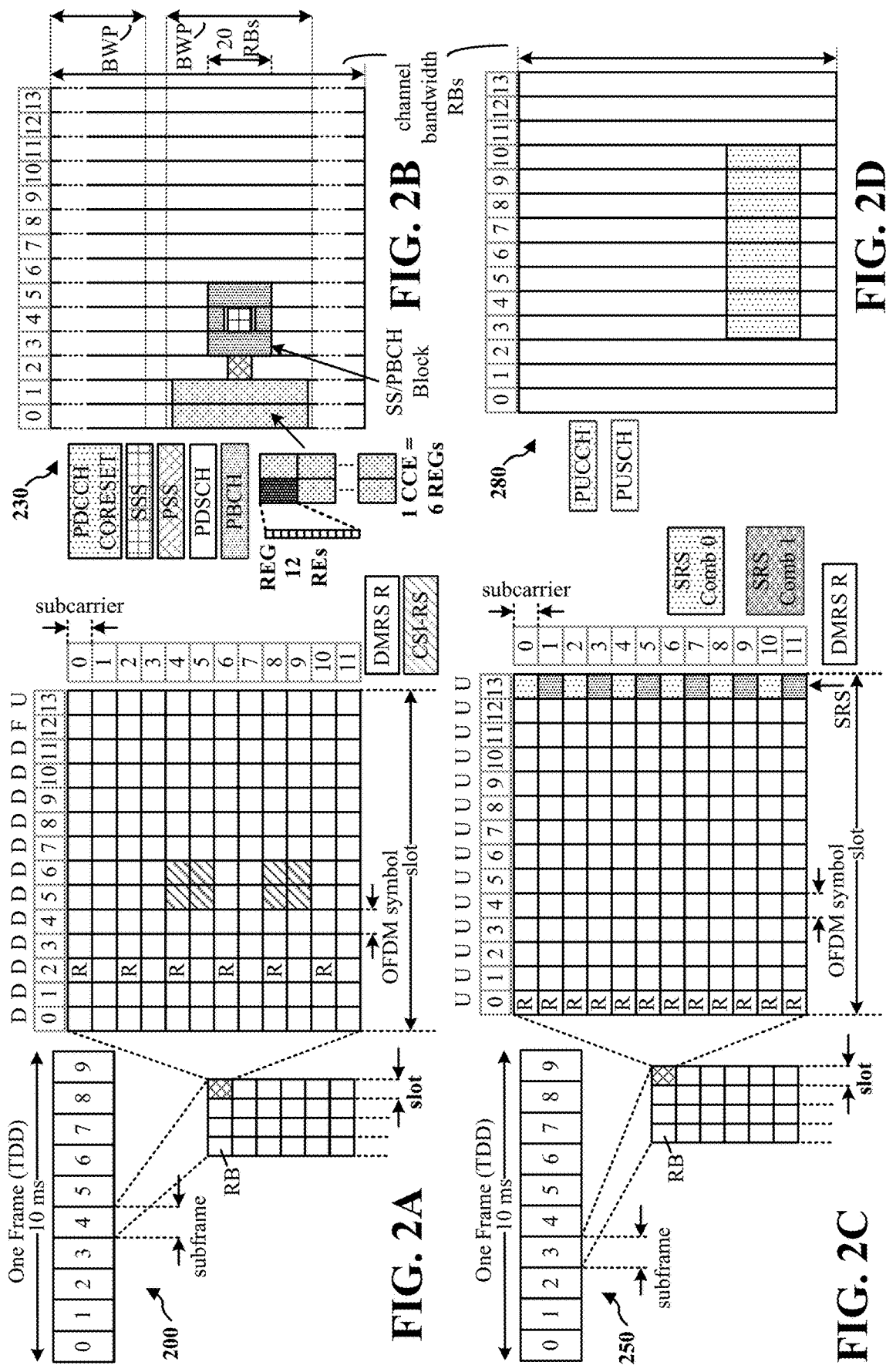
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
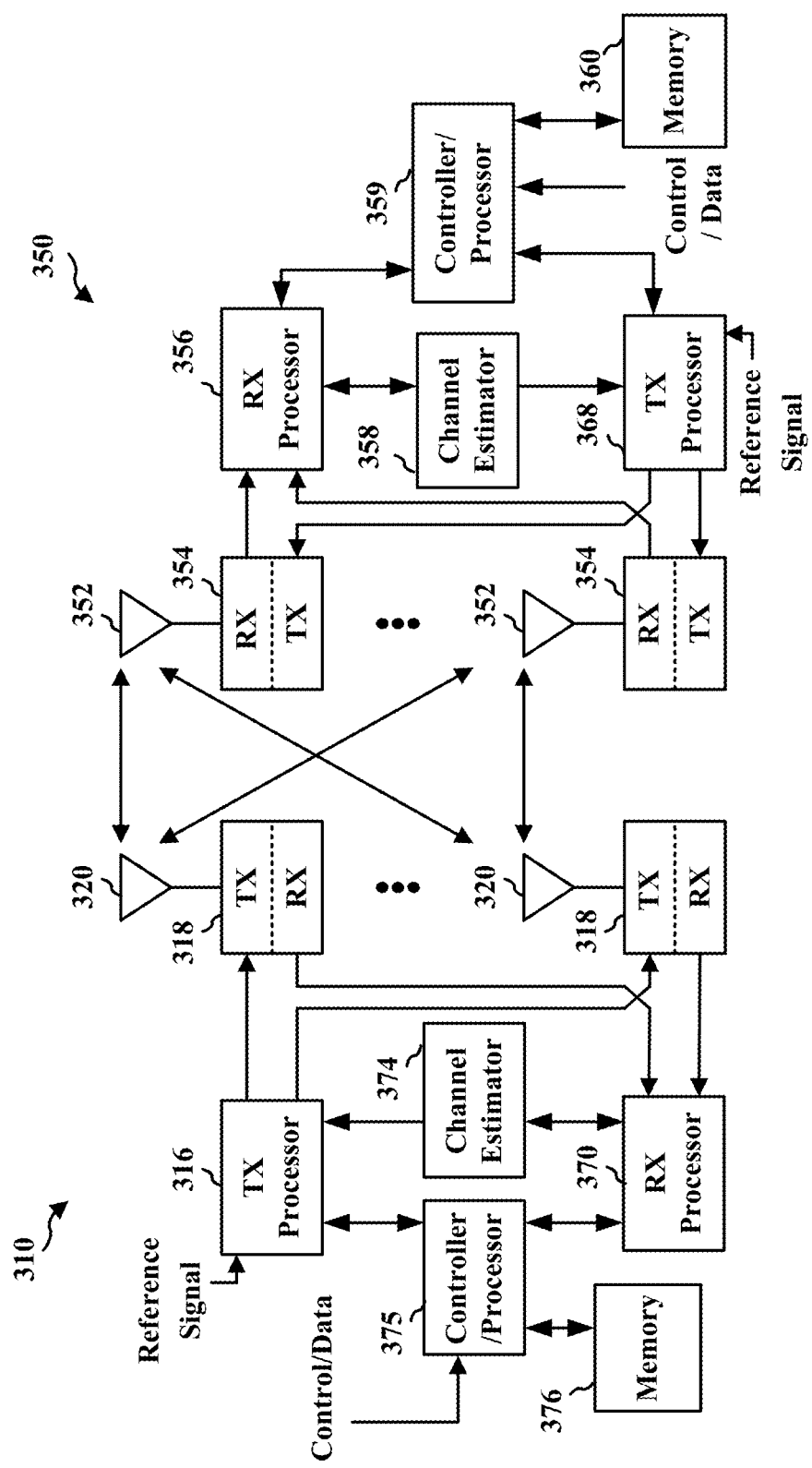
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

A growing concern in wireless communications systems is environmental factors such as carbon emissions. In addition, the power consumption of wireless communication systems may constitute a significant part of operator's operational expenses. As a result, network energy efficiency may become increasingly important. Power consumption in wireless communications systems, such as for example 5G networks, may be influenced by larger bandwidth and an increasing number of antennas and bands. Green networks may be configured to optimize power consumption and efficiency with a focus on base stations and on the network side.

Figure 4:
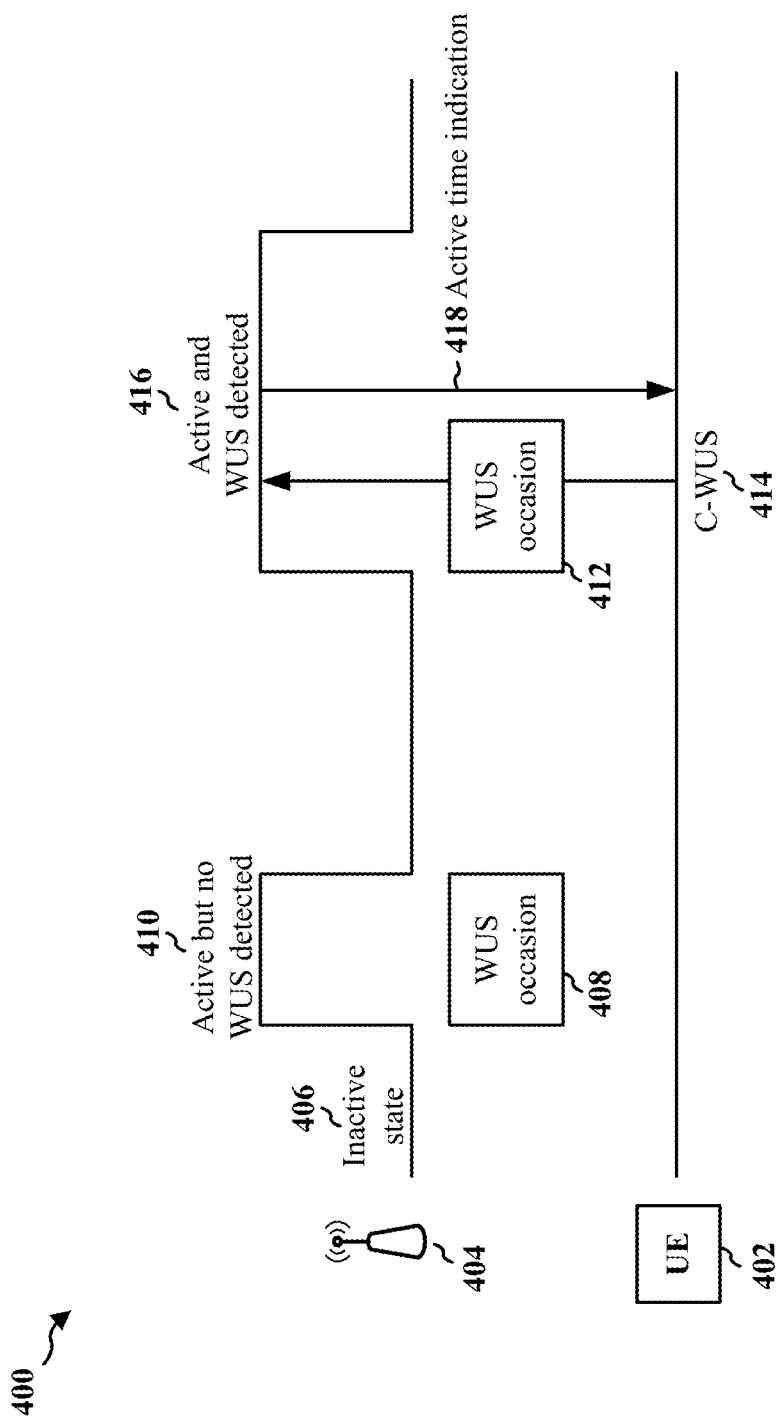
FIG. 4 is a diagram illustrating an example of a C-WUS operation.

FIG. 4 includes a diagram 400 illustrating an example of a UE waking up a cell of a base station. The diagram 400 includes a UE 402 and a base station 404. In some instances, for some certain time during the day (e.g., off-peak times), there may be no traffic or a very light traffic load in a cell. However, the cell may still have to periodically transmit broadcast signals or channels (e.g., SSB or system information). The cell may still have to periodically monitor for PRACH occasions for possible RACH or small data transmissions from a UE. For example, the base station 404 may be in an inactive state 406 during off-peak times or during instances of no traffic or very light traffic load. The base station 404 may transition to an active state 410 during a WUS occasion 408. The base station 404 may transition to the active state 410 but may not detect a WUS from the UE 402. In such instances, the base station may transition back to the inactive state 406. The base station 404 may transition to the active state 416 during the WUS occasion 412 when the base station detects the C-WUS 414. The base station 404 may provide an active time indication 418 indicating the time that the base station 404 may remain active in response to the receipt of the C-WUS 414 from the UE 402.

The periodic transmission and periodic monitoring may require the cell to be in an active mode, thereby impacting network power consumption without providing useful services. If the cell knows that there are no connected UEs or there is light traffic load in the cell, then the cell may stop or slow down periodic transmission and periodic monitoring for network power savings. However, the cell should be aware of whether one or more UEs need to go into a connected state or perform some small data transmission so that the cell may transition to the active mode. Such UEs may proactively wake up the cell by sending the C-WUS 414 to transition the cell from the inactive mode to the active mode.

Figure 5A:
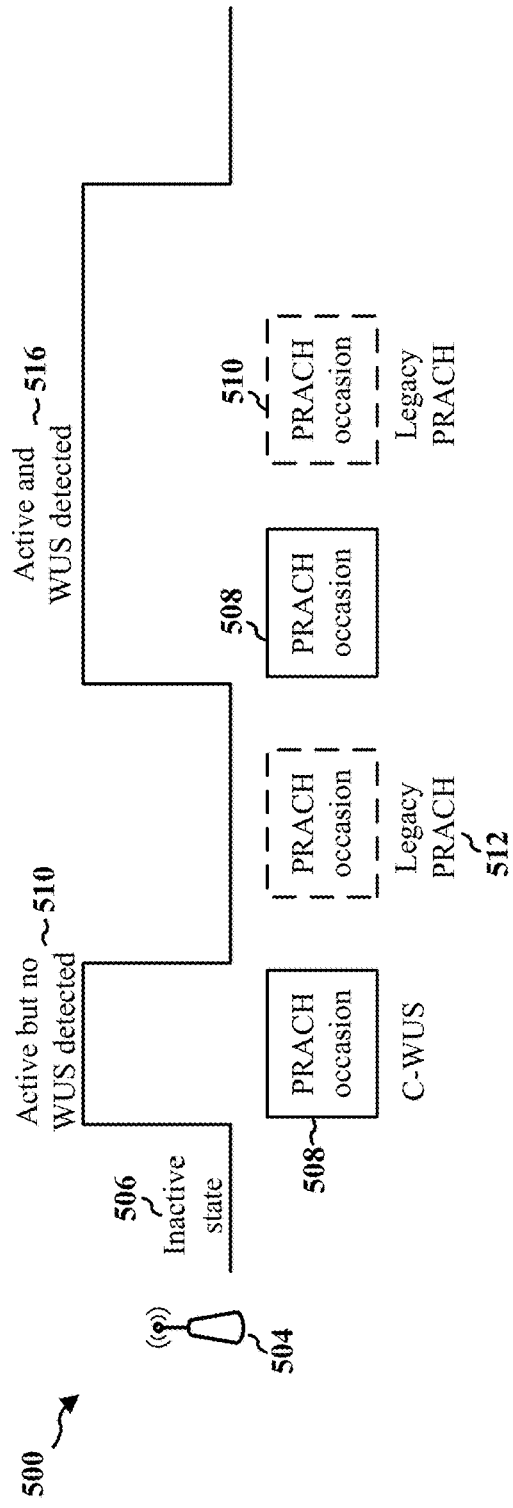
FIGS. 5A and 5B are diagrams illustrating examples of a C-WUS operation.
Figure 5B:
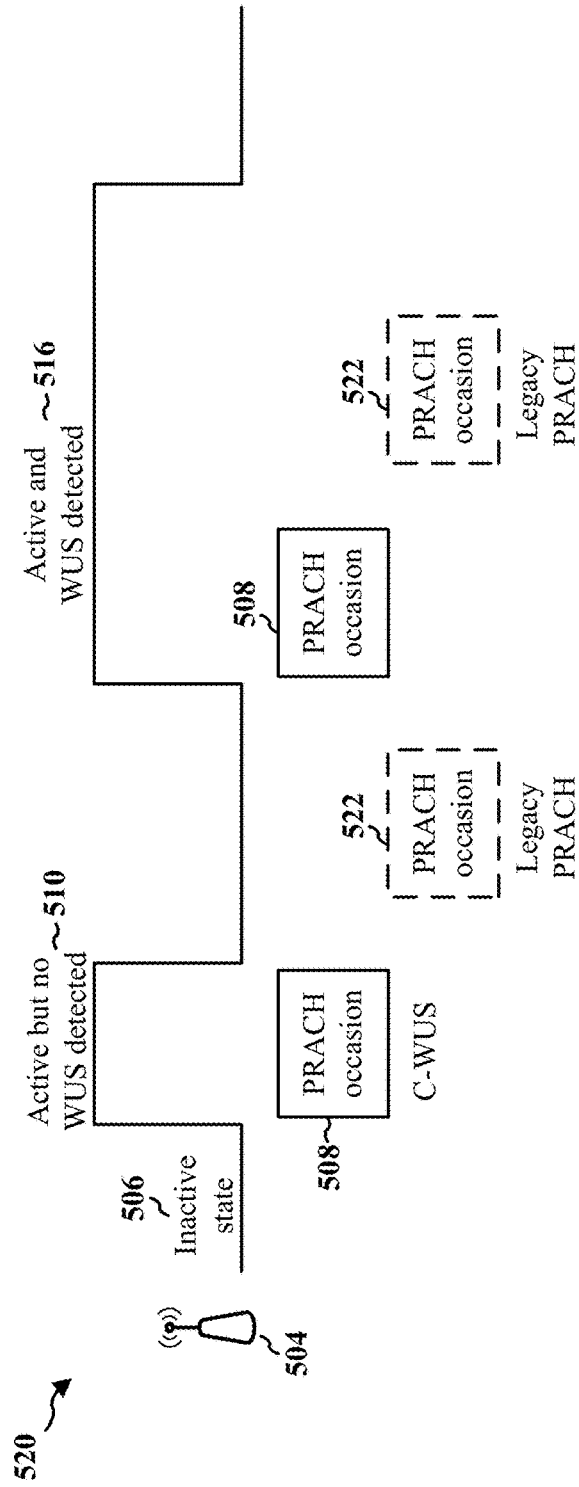

FIGS. 5A and 5B include diagrams 500 and 520 illustrating examples of utilising a PRACH as a C-WUS. For example, in diagram 500 of FIG. 5A, a PRACH 508 configuration may be configured to the UEs for C-WUS operation and a regular PRACH operation 512 (e.g., RACH in initial access) may be utilized for legacy UEs. A subset of RACH occasions may be assigned for C-WUS transmission. The base station may enter the active state at 510 but not detect a WUS from a UE. The base station may enter the active state at 516 while detecting a WUS from the UE. In diagram 520 of FIG. 5B, a separate PRACH configuration 508 may be configured to the UEs for C-WUS operation, while a different PRACH configuration 522 may be utilized for regular operations (e.g., RACH in initial access for legacy UE) for legacy UEs. The base station may enter the active state at 510 but not detect a WUS from a UE. The base station may enter the active state at 516 while detecting a WUS from the UE.

Figure 6:
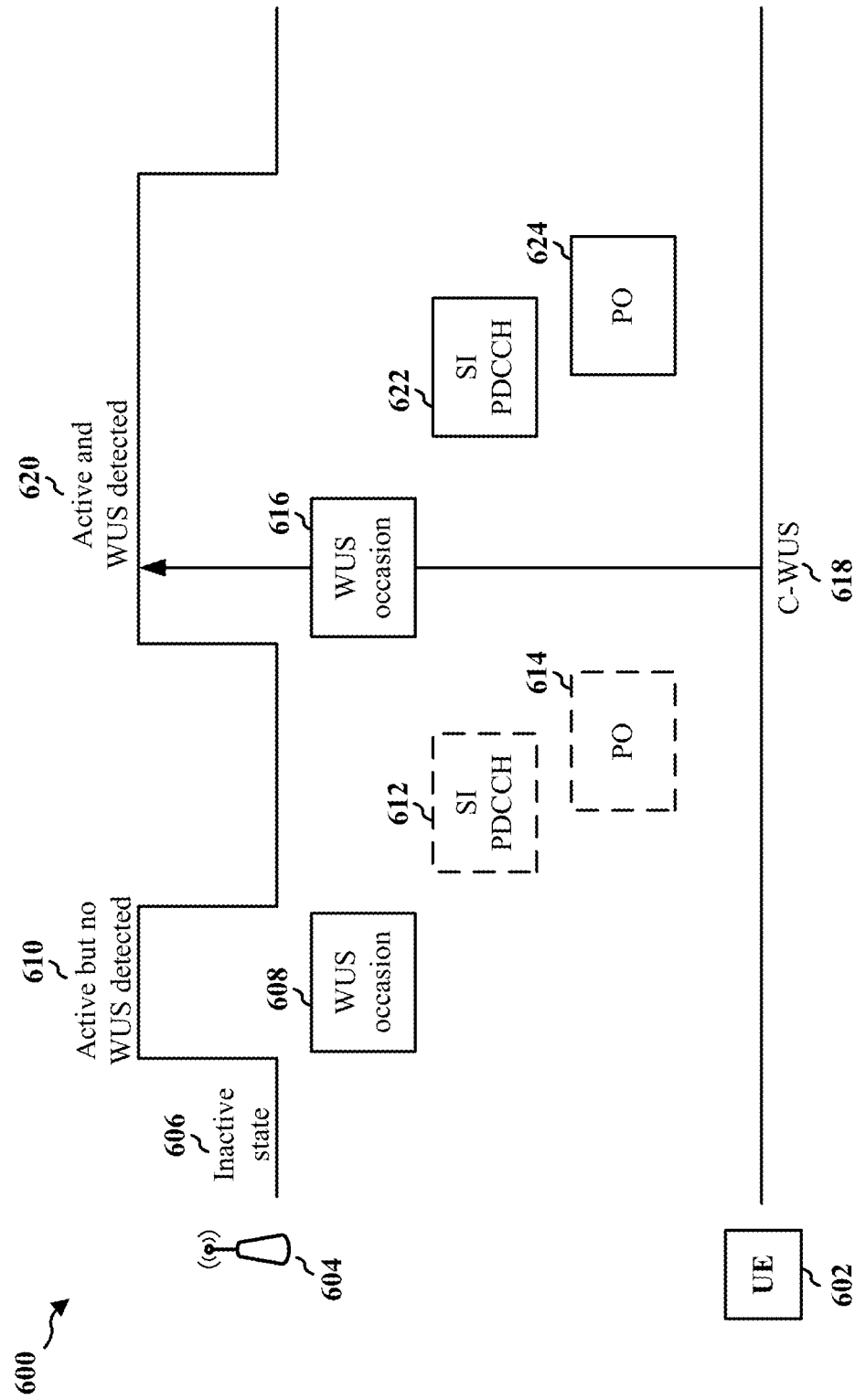
FIG. 6 is a diagram illustrating an example of periodic downlink monitoring occasions.

FIG. 6 includes a diagram 600 of periodic downlink monitoring occasions. The diagram 600 includes a UE 602 and a base station 604. The base station 604 may enter the inactive state 606 during off-peak times or during instances of no traffic or very light traffic load. The base station 604 may transition to an active state 610 during a WUS occasion 608. The base station 604 may transition to the active state 610 but may not detect a WUS from the UE 602. In such instances, the base station may transition back to the inactive state 606. While in the inactive state 406, periodic downlink monitoring occasions may be configured for the UE, such as SI PDCCH 612 or paging occasion (PO) 614. The PO 614 may include a paging PDCCH or a paging early indication (PEI). In some instances, the SI PDCCH 612 or PO 614 may not be monitored while the base station 604 is in the inactive state 606. Periodic signaling may be configured for the UE to perform radio resource management (RRM). For example, SSB in cell reselection in idle/inactive mode, or SSB or CSI-RS for handover in connected mode. The base station 604 may transition to the active state 620 during the WUS occasion 616 when the base station detects the C-WUS 618 from the UE 602. In instances where a C-WUS operation is configured, some downlink resource occasions may be scheduled during the cell inactive state 606 (e.g., sleep time). In such instances, the UE may SI PDCCH 622 or the PO 624 may be monitored while the base station is in the active state 620.

Aspects presented herein provide a configuration for downlink reception with a C-WUS operation. For example, a UE may be configured to monitor for downlink resources while at least one cell of a base station is in an inactive mode. For example, the UE may receive a C-WUS configuration from the base station configuring the UE to monitor for WUS occasions while the at least one cell is in an inactive state, such that at least one downlink resource occasion may be scheduled for reception, by the UE, while the at least one cell is in the inactive mode.

In some instances, in a configured downlink resources or monitoring occasions for a signal or channel in the inactive state or cell sleep duration, the UE may not perform any downlink signal or channel reception. The UE not performing any downlink signal or channel reception while the signal or channel is in the active state may provide the UE some power savings. In some instances, the UE may perform signal or channel reception. In some instances, the UE may perform reception for some signals or channels. For example, the UE may not monitor SI PDCCH monitoring occasions or PEI. In some instances, the UE may monitor paging PDCCH monitor occasions. In some instances, such as for RRM measurement, the UE may not perform RRM measurement or performing of RRM measurement may be determined by the UE. In some instances, such as for the configured resources or occasions in the inactive state, the network may configure the UE to perform downlink signal or channel reception or monitoring for one or more signals or channels.

Figure 7:
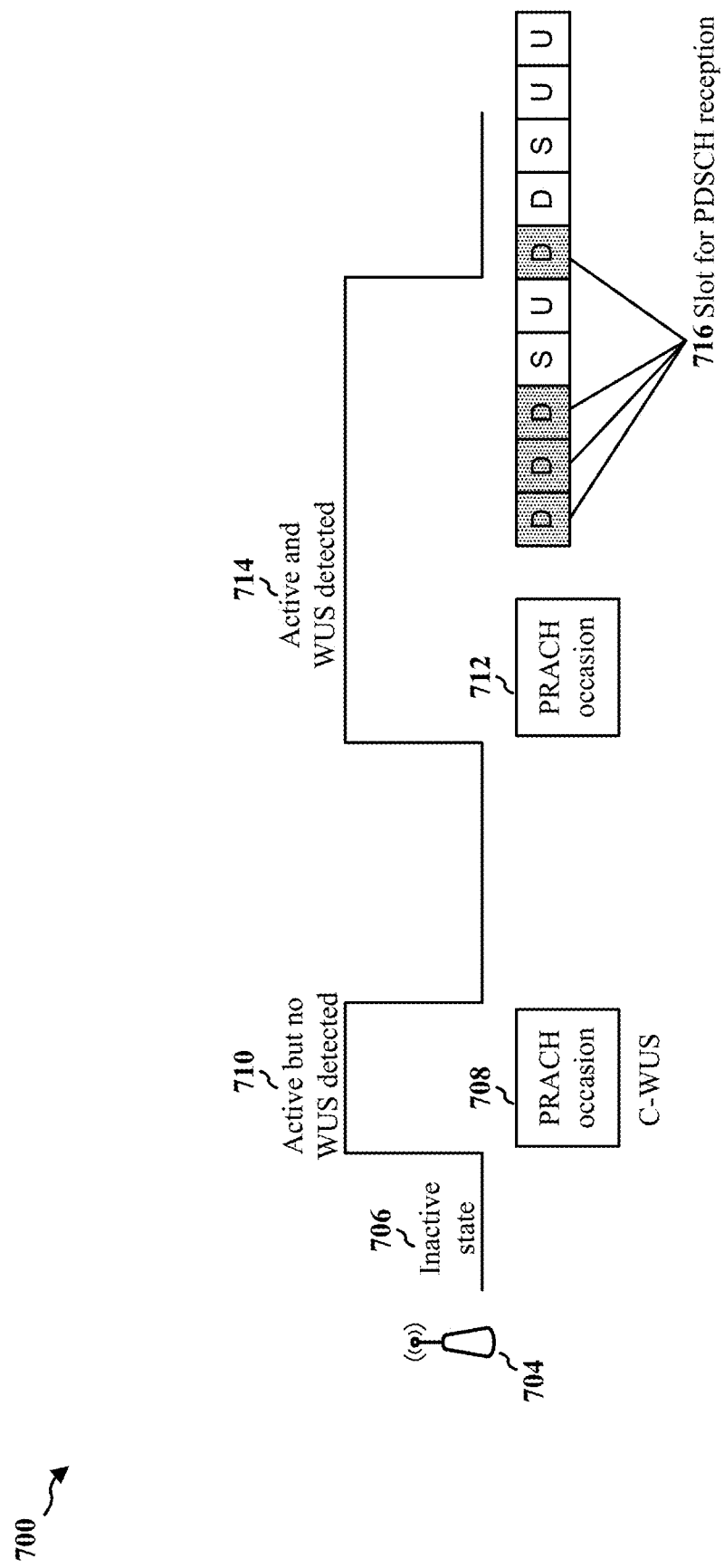
FIG. 7 is a diagram illustrating an example of downlink resources scheduled during a cell inactive mode.

FIG. 7 includes a diagram 700 illustrating an example of a downlink resource occasion scheduled for reception while the at least one cell is in an inactive mode. The diagram 700 includes a base station 704, while the UE is not shown for ease of illustration. The base station 704 may transition from an inactive state 706 to an active state 710 during a PRACH occasions 708. The base station 704 may transition back to the inactive state 706 if a WUS is not detected during the active state 710. The base station may transition to the active state 714 if a WUS is detected during the PRACH occasions 712. The UE may be scheduled, during the active state 714, with resources for downlink reception that may extend beyond the active state 714. For example, some PDSCH repetitions 716 may be configured for reception during the active state 714, while some PDSCH repetitions 716 may be configured for reception outside of the active state 714 and during the inactive state 706. In such instances, if the UE receives a scheduling grant within the cell active time (e.g., active state 714) with resources for downlink reception outside or beyond the cell active time, the UE may continue to receive the signal or channel in the scheduled resources. The base station may remain active but may not send a new indication of a time extension for the base station to remain in the active state 714. In some instances, the UE may only receive the signal or channel in the scheduled resources inside or during the active state 714. The operation of the UE may be configured by the network.

Figure 8:
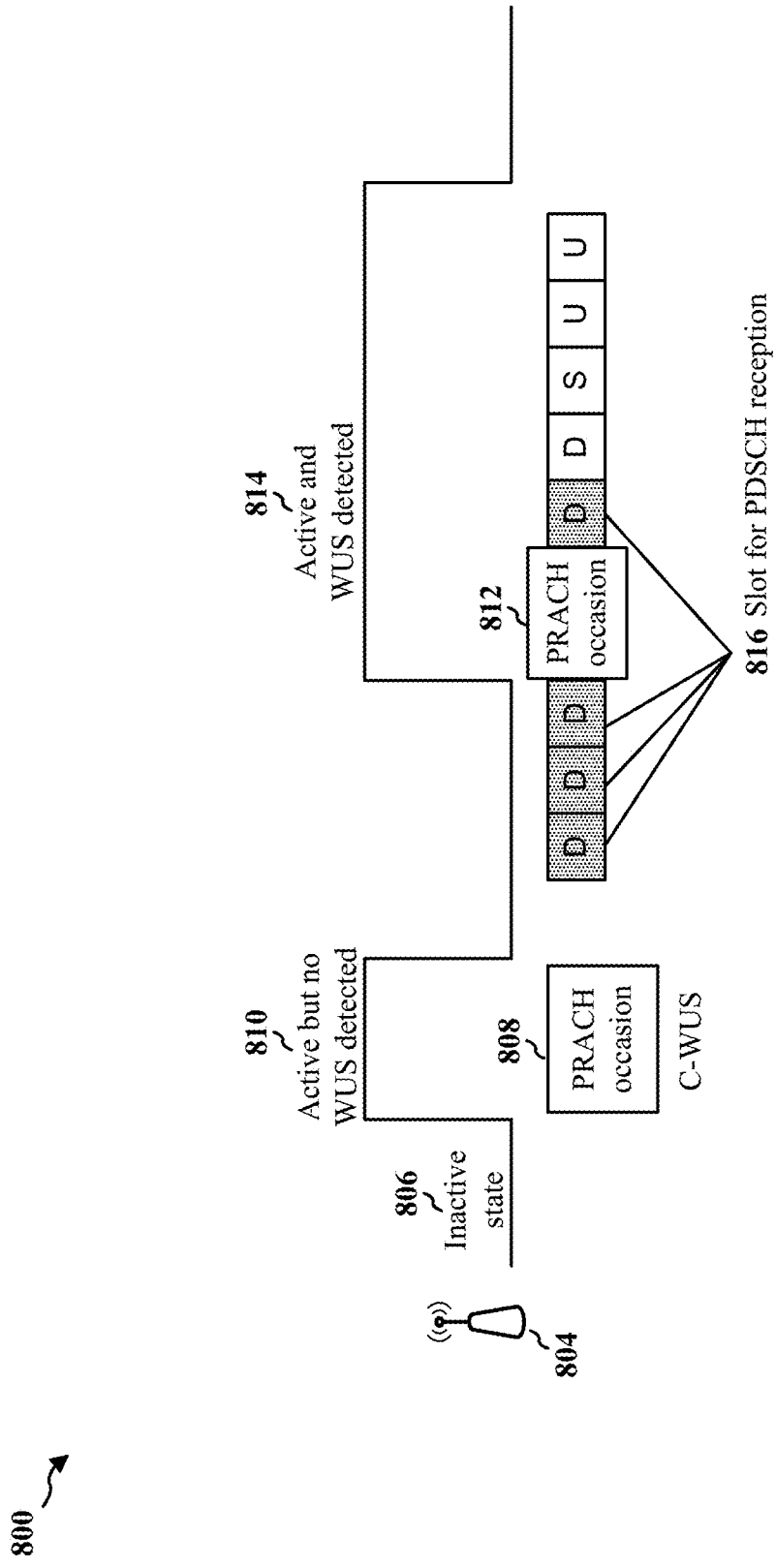
FIG. 8 is a diagram illustrating an example of downlink resources scheduled during a cell inactive mode.

FIG. 8 includes a diagram 800 illustrating an example of a downlink resource occasions scheduled for reception while the at least one cell is in an inactive mode. The diagram 800 includes a base station 804, while the UE is not shown for ease of illustration. The base station 804 may transition from an inactive state 806 to an active state 810 during a PRACH occasions 808. The base station 804 may transition back to the inactive state 806 if a WUS is not detected during the active state 810. The base station may transition to the active state 814 if a WUS is detected during the PRACH occasions 812. The UE may be scheduled, during the active state 814, with resources for downlink reception during the inactive state prior to the active state 814. In some instances, such as for SPS PDSCH, the pre-configured resources may overlap with both inactive state and active state durations. For example, some slots 816 for SPS PDSCH may be configured for reception during the inactive state 806 while at least one is scheduled within the active state 814. In such instances, for SPS PDSCH repetitions, the UE may count the first repetition in the first slot in the resource occasion even if the resource is outside the cell active time. In some instances, the UE may count the first repetition from the first slot in the resource occasion that is within or during the active state (e.g., 814). The operation of the UE may be configured by the network.

Figure 9:
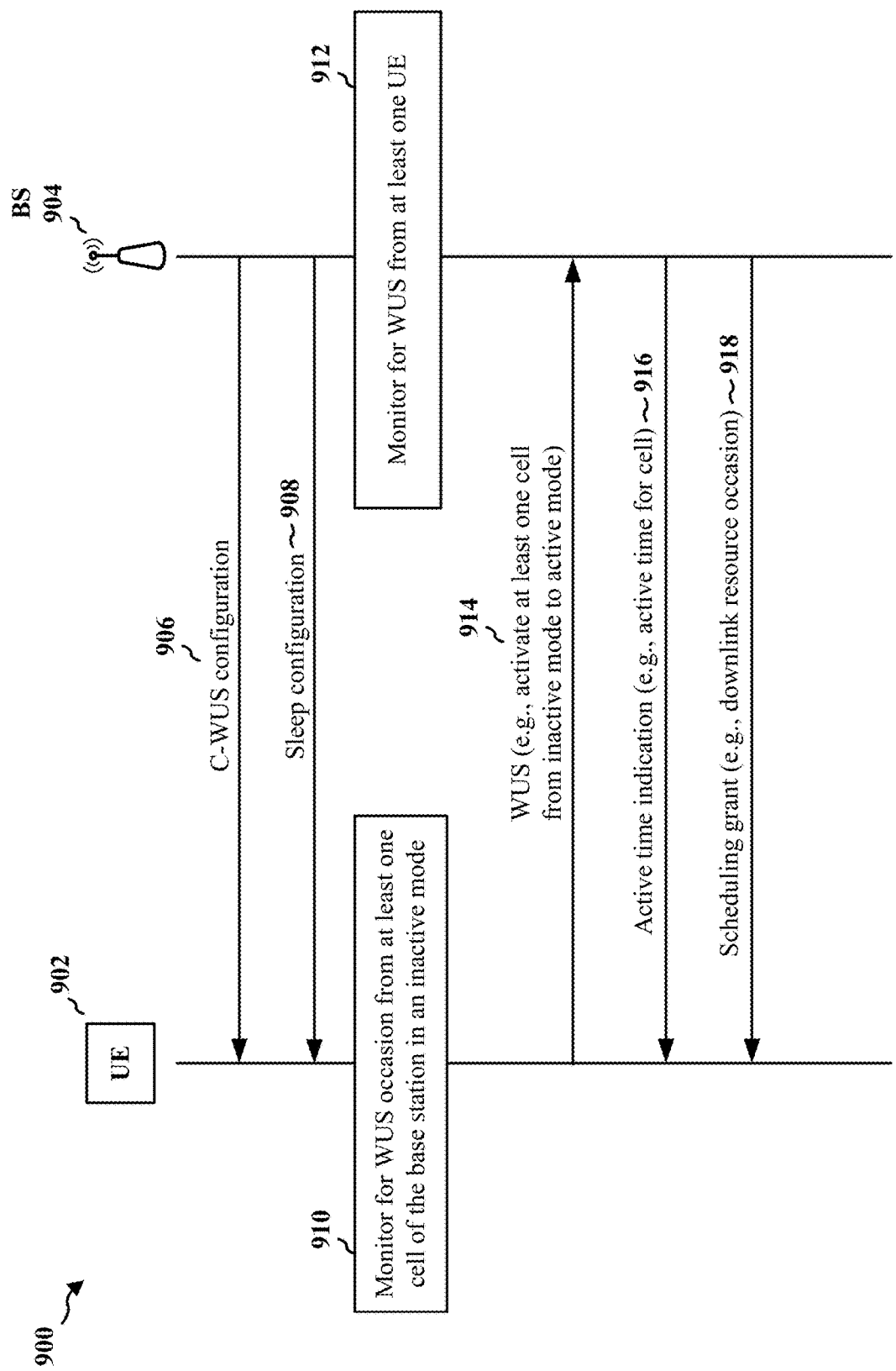
FIG. 9 is a call flow diagram of signaling between a UE and a base station.

FIG. 9 is a call flow diagram 900 of signaling between a UE 902 and a base station 904. The base station 904 may be configured to provide at least one cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350.

As illustrated at 906, the base station 904 may transmit a C-WUS configuration. The base station may transmit the C-WUS configuration to at least one UE 902. The UE 902 may receive the C-WUS configuration from the base station 904. The C-WUS configuration may configure the at least one UE to activate at least one cell of the base station from an inactive mode.

As illustrated at 908, the base station 904 may transmit a sleep configuration. The base station may transmit the sleep configuration to the at least one UE 902. The UE 902 may receive the sleep configuration from the base station 904. The sleep configuration may configure the at least one UE to receive at least one downlink resource occasion associated with the at least one cell is in the inactive mode.

As illustrated at 910, the UE 902 may monitor for at least a WUS occasion from the at least one cell of the base station 904. The UE may monitor for at least the WUS occasion from the at least one cell of the base station in the inactive mode. At least one downlink resource occasion may be associated with the at least one cell in the inactive mode. In some aspects, the UE may skip the reception of the at least one downlink resource occasion scheduled for reception while the at least one cell is in the inactive mode. In some aspects, the UE may receive each of the at least one downlink resource occasion scheduled for reception while the at least one cell is in the inactive mode. In some aspects, the UE may receive the at least one downlink resource occasion scheduled for reception while the at least one cell is in the inactive mode. In some aspects, the at least one downlink resource occasion may comprise SPS PDSCH repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

As illustrated at 912, the base station 904 may monitor for at least a WUS from the at least one UE 902. At least one cell in the inactive mode associated with the base station having corresponding WUS occasions monitors for at least the WUS from the at least one UE. In some aspects, the at least one UE may skip reception of the at least one downlink resource occasion scheduled for reception while the at least one cell is in the inactive mode. In some aspects, the at least one UE may receive each of the at least one downlink resource occasion scheduled for reception while the at least one cell is in the inactive mode. In some aspects, the at least one UE may receive the at least one downlink resource occasion scheduled for reception while the at least one cell is in the inactive mode. In some aspects, the at least one downlink resource occasion may comprise SPS PDSCH repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

As illustrated at 914, the UE 902 may transmit a C-WUS to activate the at least one cell. The UE may transmit the C-WUS to the base station 904. The base station 904 may receive the C-WUS from the UE 902. The C-WUS may activate the at least one cell from the inactive mode to an active mode.

As illustrated at 916, the base station 904 may transmit an active time indication. The base station may transmit the active time indication to the at least one UE 902. The UE 902 may receive the active time indication from the base station 904. The active time indication may indicate an active time for the at least one cell of the base station.

As illustrated at 918, the base station may transmit a scheduling grant for the at least one downlink resource occasion. The base station may transmit the scheduling grant to the at least one UE 902. The UE 902 may receive the scheduling grant from the base station 904. Reception of part of the at least one downlink resource by the at least one UE may be scheduled while the at least one cell is in an active mode and in the inactive mode. In some aspects, the at least one UE may receive the at least one downlink resource. The at least one cell of the base station may remain in the active mode to allow for reception of the at least one downlink resource. In some aspects, the at least one UE may receive part of the at least one downlink resource that is scheduled during the active mode. Reception of the part of the at least one downlink resource scheduled during the inactive mode may be skipped by the at least one UE.

Figure 10:
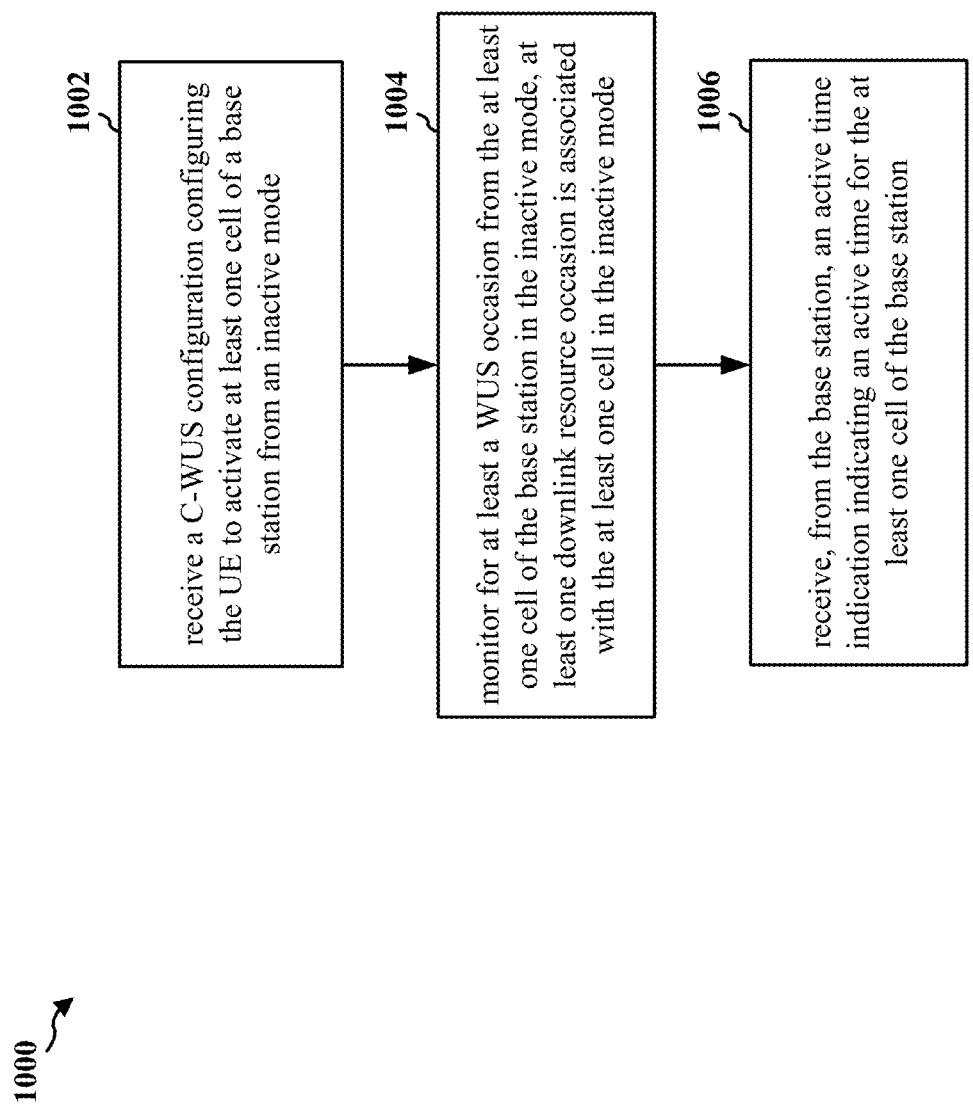
FIG. 10 is a flowchart of a method of wireless communication.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to monitor for downlink resources while at least one cell of a base station is in an inactive mode.

At 1002, the UE may receive a C-WUS configuration. For example, 1002 may be performed by configuration component 1240 of apparatus 1202. The UE may receive the C-WUS configuration from a base station. The C-WUS configuration may configure the UE to activate at least one cell of the base station from an inactive mode.

At 1004, the UE may monitor for at least a WUS occasion from the at least one cell of the base station. For example, 1004 may be performed by monitor component 1242 of apparatus 1202. The UE may monitor for at least the WUS occasion from the at least one cell of the base station in the inactive mode. At least one downlink resource occasion may be associated with the at least one cell in the inactive mode. In some aspects, the UE may skip the reception of the at least one downlink resource occasion associated with the at least one cell in the inactive mode. In some aspects, the UE may receive each of the at least one downlink resource occasion associated with the at least one cell in the inactive mode. In some aspects, the UE may receive the at least one downlink resource occasion associated with the at least one cell in the inactive mode. In some aspects, the at least one downlink resource occasion may comprise semi-persistent scheduling (SPS) physical downlink shared channel (PDSCH) repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

At 1006, the UE may receive an active time indication. For example, 1006 may be performed by indication component 1246 of apparatus 1202. The UE may receive the active time indication from the base station. The active time indication may indicate an active time for the at least one cell of the base station.

Figure 11:
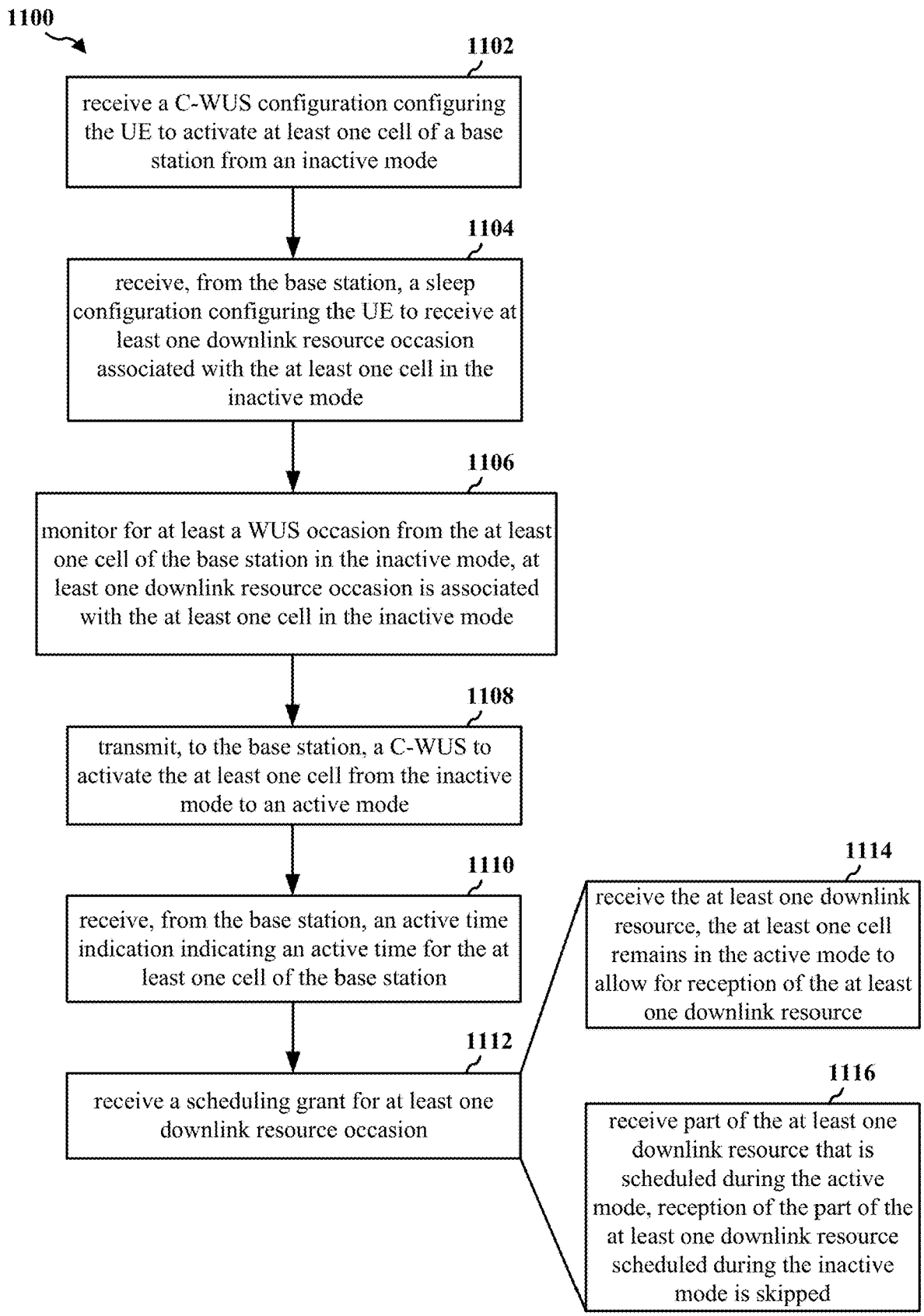
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to monitor for downlink resources while at least one cell of a base station is in an inactive mode.

At 1102, the UE may receive a C-WUS configuration. For example, 1102 may be performed by configuration component 1240 of apparatus 1202. The UE may receive the C-WUS configuration from a base station. The C-WUS configuration may configure the UE to activate at least one cell of the base station from an inactive mode.

At 1104, the UE may receive a sleep configuration. For example, 1104 may be performed by configuration component 1240 of apparatus 1202. The UE may receive the sleep configuration from the base station. The sleep configuration may configure the UE to receive at least one downlink resource occasion associated with the at least one cell in the inactive mode.

At 1106, the UE may monitor for at least a WUS occasion from the at least one cell of the base station. For example, 1106 may be performed by monitor component 1242 of apparatus 1202. The UE may monitor for at least the WUS occasion from the at least one cell of the base station in the inactive mode. At least one downlink resource occasion may be associated with the at least one cell in the inactive mode. In some aspects, the UE may skip the reception of the at least one downlink resource occasion associated with the at least one cell in the inactive mode. In some aspects, the UE may receive each of the at least one downlink resource occasion associated with the at least one cell in the inactive mode. In some aspects, the UE may receive the at least one downlink resource occasion associated with the at least one cell in the inactive mode. In some aspects, the at least one downlink resource occasion may comprise SPS PDSCH repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

At 1108, the UE may transmit a C-WUS to activate the at least one cell. For example, 1108 may be performed by C-WUS component 1244 of apparatus 1202. The UE may transmit the C-WUS to the base station. The C-WUS may activate the at least one cell from the inactive mode to an active mode.

At 1110, the UE may receive an active time indication. For example, 1110 may be performed by indication component 1246 of apparatus 1202. The UE may receive the active time indication from the base station. The active time indication may indicate an active time for the at least one cell of the base station.

At 1112, the UE may receive a scheduling grant for at least one downlink resource occasion. For example, 1112 may be performed by indication component 1246 of apparatus 1202. The UE may receive the scheduling grant for the at least one downlink resource occasion from the base station. Reception of part of the at least one downlink resource may be scheduled while the at least one cell may be in the active mode and in the inactive mode. For example, at 1114, the UE may receive the at least one downlink resource, wherein the at least one cell may remain in the active mode to allow for reception of the at least one downlink resource. In another example, at 1116, the UE may receive part of the at least one downlink resource that is scheduled during the active mode, such that reception of the part of the at least one downlink resource scheduled during the inactive mode may be skipped.

Figure 12:
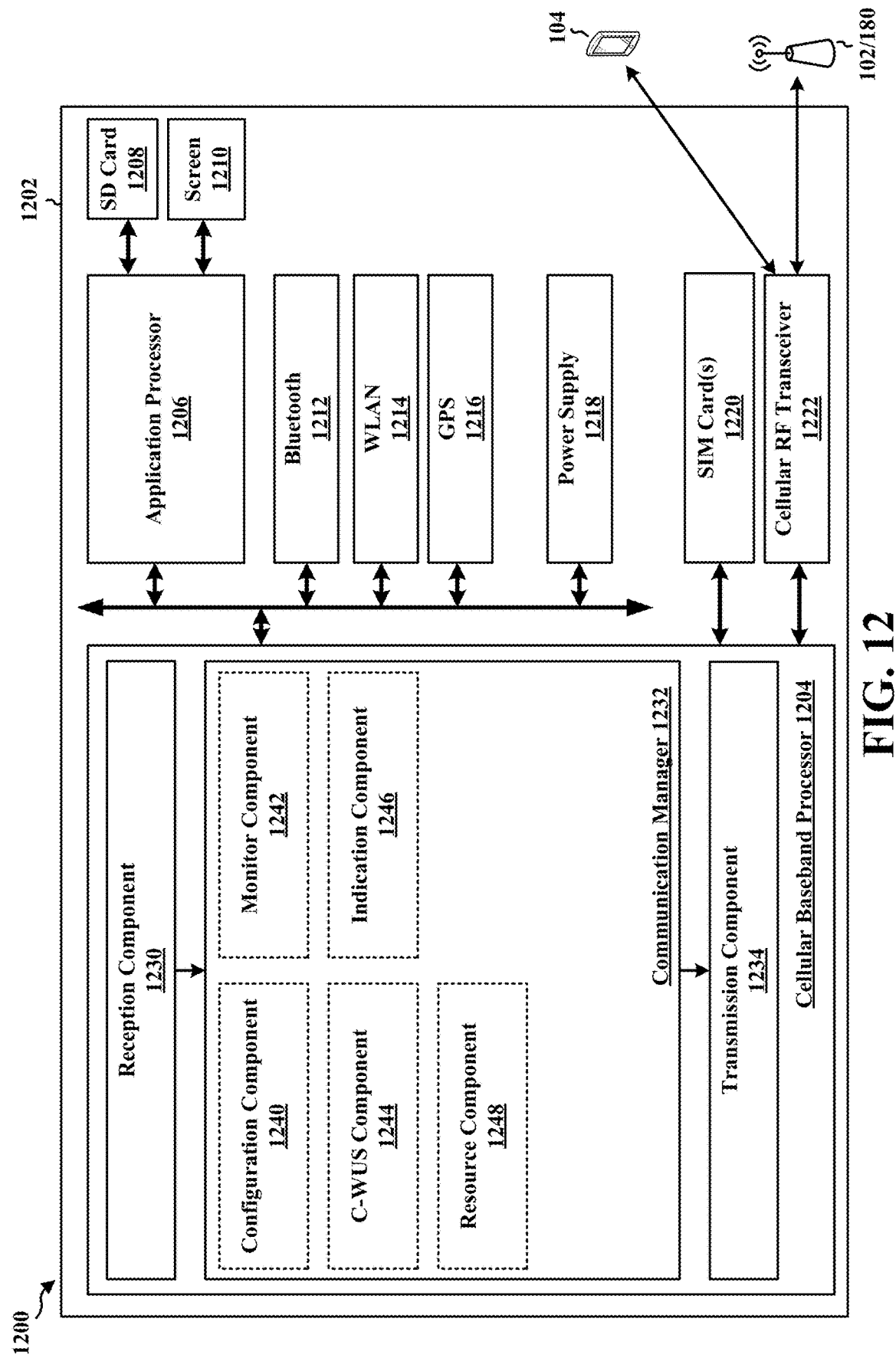
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a configuration component 1240 that is configured to receive a C-WUS configuration, e.g., as described in connection with 1002 of FIG. 10 or 1102 of FIG. 11. The configuration component 1240 may be configured to receive a sleep configuration, e.g., as described in connection with 1104 of FIG. 11. The communication manager 1232 further includes a monitor component 1242 that is configured to monitor for at least a WUS occasion from the at least one cell of the base station, e.g., as described in connection with 1004 of FIG. 10 or 1106 of FIG. 11. The communication manager 1232 further includes a C-WUS component 1244 that is configured to transmit a C-WUS to activate the at least one cell, e.g., as described in connection with 1108 of FIG. 11. The communication manager 1232 further includes an indication component 1246 that is configured to receive an active time indication, e.g., as described in connection with 1006 of FIG. 10 or 1110 of FIG. 11. The communication manager 1232 further includes resource component 1248 that is configured to receive a scheduling grant for at least one downlink resource occasion, e.g., as described in connection with 1112 of FIG. 11. The resource component 1248 may be configured to receive the at least one downlink resource, e.g., as described in connection with 1114 of FIG. 11. The resource component 1248 may be configured to receive part of the at least one downlink resource that is scheduled during the active mode, e.g., as described in connection with 1116 of FIG. 11.

The apparatus may include additional components that perform each of the blocks of the algorithm in the flowcharts of FIG. 10 or 11. As such, each block in the flowcharts of FIG. 10 or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving a C-WUS configuration configuring the UE to activate at least one cell of a base station from an inactive mode. The apparatus includes means for monitoring for at least a WUS occasion from the at least one cell of the base station while the at least one cell is in the inactive mode. At least one downlink resource occasion is scheduled for reception while the at least one cell is in the inactive mode. The apparatus includes means for receiving, from the base station, an active time indication indicating an active time for the at least one cell of the base station. The apparatus further includes means for receiving, from the base station, a sleep configuration configuring the UE to receive at least one downlink resource occasion while the at least one cell is in the inactive mode. The apparatus further includes means for receiving a scheduling grant for at least one downlink resource occasion. Reception of part of at least one downlink resource is scheduled while the at least one cell is in an active mode and in the inactive mode. The apparatus further includes means for receiving the at least one downlink resource. The at least one cell remains in the active mode to allow for reception of the at least one downlink resource. The apparatus further includes means for receiving part of the at least one downlink resource that is scheduled during the active mode. Reception of the part of the at least one downlink resource scheduled during the inactive mode is skipped. The apparatus further includes means for transmitting, to the base station, a C-WUS to activate the at least one cell from the inactive mode to an active mode. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
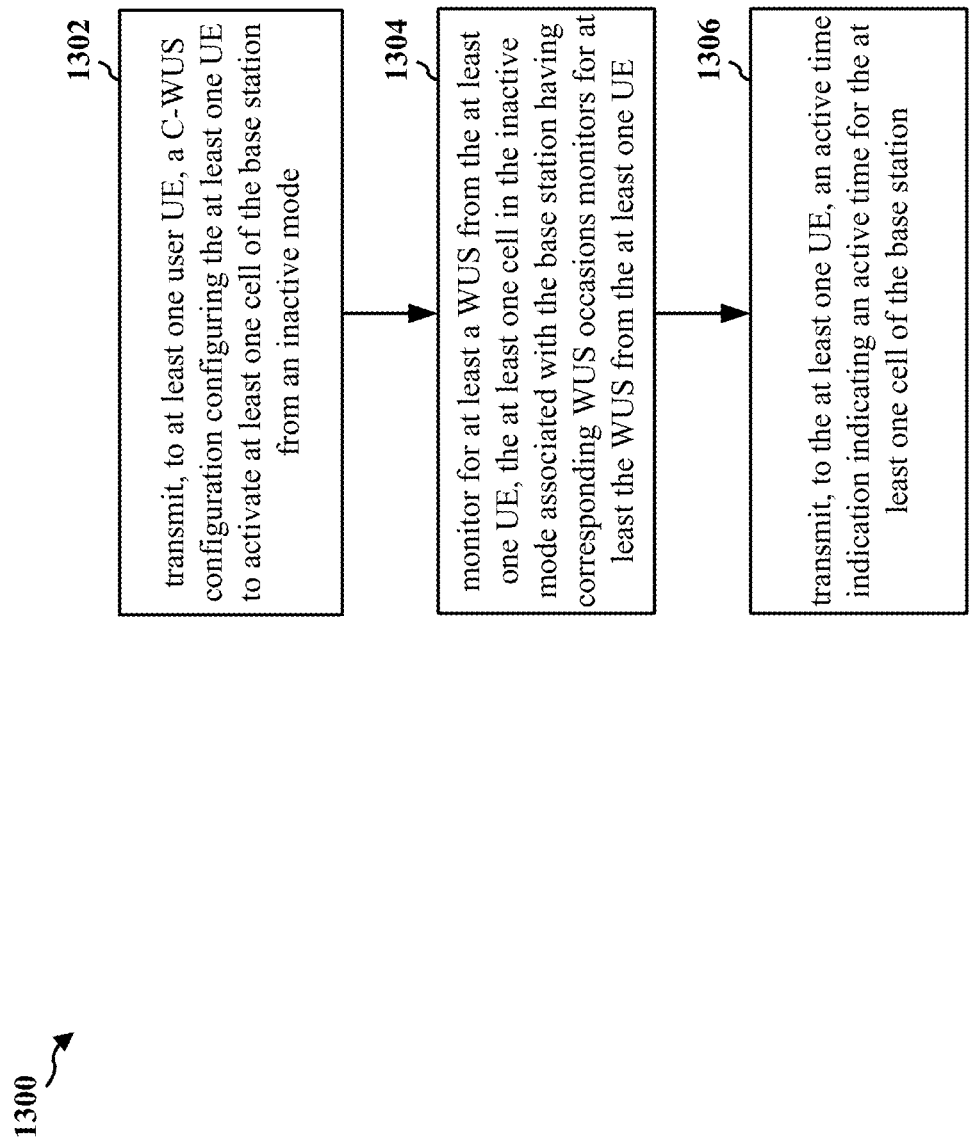
FIG. 13 is a flowchart of a method of wireless communication.

FIG. 13 is a flowchart 1300 of a method of wireless communication. The method may be performed by a base station or a component of a base station (e.g., the base station 102/180; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to monitor for downlink resources while at least one cell of the base station is in an inactive mode.

At 1302, the base station may transmit a C-WUS configuration. For example, 1302 may be performed by configuration component 1540 of apparatus 1502. The base station may transmit the C-WUS configuration to at least one UE. The C-WUS configuration may configure the at least one UE to activate at least one cell of the base station from an inactive mode.

At 1304, the base station may monitor for at least a WUS from the at least one UE. For example, 1304 may be performed by monitor component 1542 of apparatus 1502. At least one cell in the inactive mode associated with the base station having corresponding WUS occasions monitors for at least the WUS from the at least one UE. In some aspects, the at least one UE may skip reception of at least one downlink resource occasion associated with the at least one cell in the inactive mode. In some aspects, the at least one UE may receive each of the at least one downlink resource occasion associated with the at least one cell in the inactive mode. In some aspects, the at least one UE may receive the at least one downlink resource occasion associated with the at least one cell in the inactive mode. In some aspects, the at least one downlink resource occasion may comprise SPS PDSCH repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

At 1306, the base station may transmit an active time indication. For example, 1306 may be performed by indication component 1546 of apparatus 1502. The base station may transmit the active time indication to the at least one UE. The active time indication may indicate an active time for the at least one cell of the base station.

Figure 14:
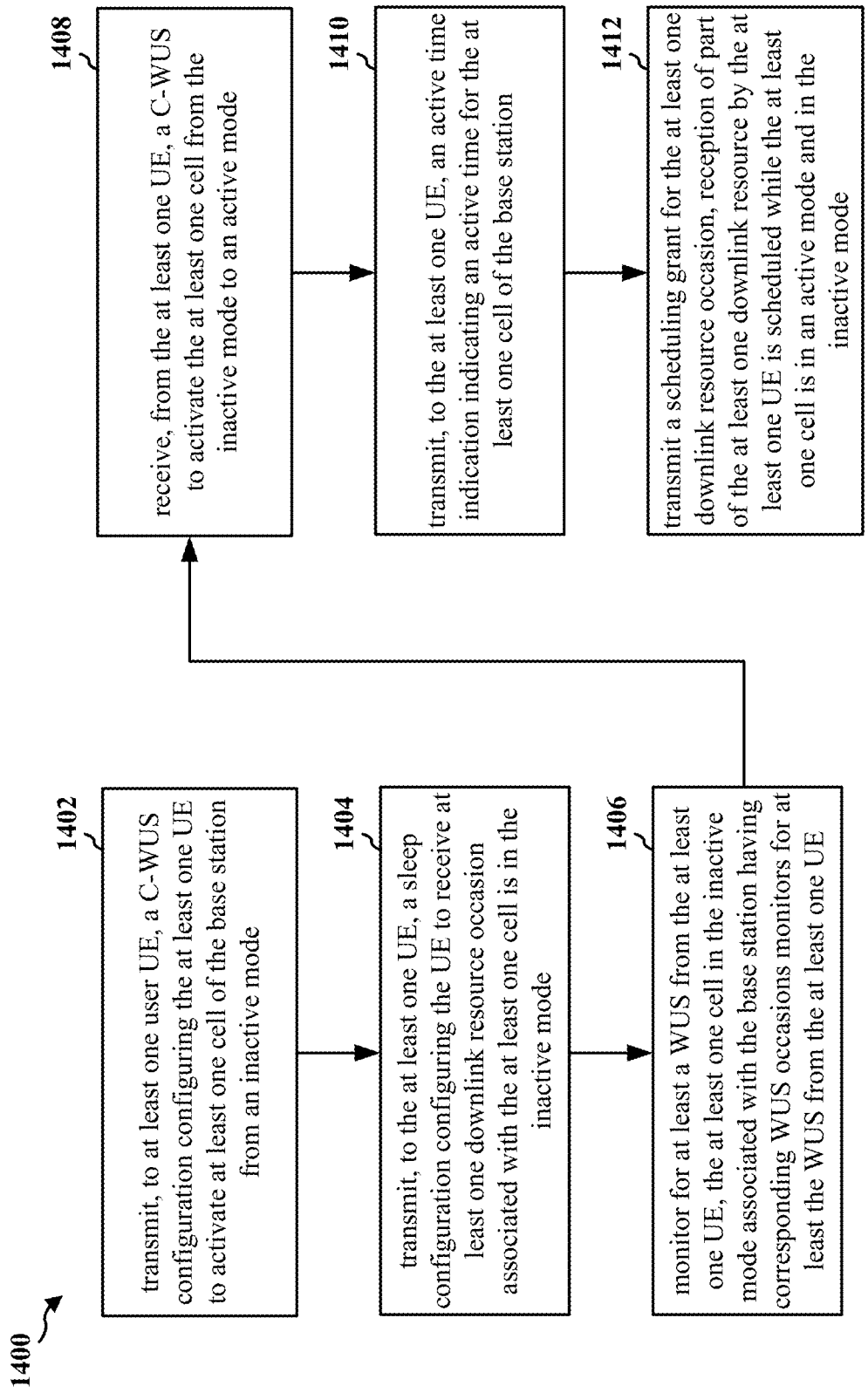
FIG. 14 is a flowchart of a method of wireless communication.

FIG. 14 is a flowchart 1400 of a method of wireless communication. The method may be performed by a base station or a component of a base station (e.g., the base station 102/180; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to monitor for downlink resources while at least one cell of the base station is in an inactive mode.

At 1402, the base station may transmit a C-WUS configuration. For example, 1402 may be performed by configuration component 1540 of apparatus 1502. The base station may transmit the C-WUS configuration to at least one UE. The C-WUS configuration may configure the at least one UE to activate at least one cell of the base station from an inactive mode.

At 1404, the base station may transmit a sleep configuration. For example, 1404 may be performed by configuration component 1540 of apparatus 1502. The base station may transmit the sleep configuration to the at least one UE. The sleep configuration may configure the at least one UE to receive at least one downlink resource occasion associated with the at least one cell in the inactive mode.

At 1406, the base station may monitor for at least a WUS from the at least one UE. For example, 1406 may be performed by monitor component 1542 of apparatus 1502. At least one cell in the inactive mode associated with the base station having corresponding WUS occasions monitors for at least the WUS from the at least one UE. In some aspects, the at least one UE may skip reception of the at least one downlink resource occasion scheduled for reception while the at least one cell is in the inactive mode. In some aspects, the at least one UE may receive each of the at least one downlink resource occasion scheduled for reception while the at least one cell is in the inactive mode. In some aspects, the at least one UE may receive the at least one downlink resource occasion scheduled for reception while the at least one cell is in the inactive mode. In some aspects, the at least one downlink resource occasion may comprise SPS PDSCH repetitions. For example, a first repetition in a first slot in a resource occasion may comprise the first slot of the resource occasion. In another example, a first repetition in a first slot in a resource occasion may comprise the first slot that occurs within an active mode of the at least one cell of the base station.

At 1408, the base station may receive a C-WUS to activate the at least one cell. For example, 1408 may be performed by C-WUS component 1544 of apparatus 1502. The base station may receive the C-WUS from the at least one UE. The C-WUS may activate the at least one cell from the inactive mode to an active mode.

At 1410, the base station may transmit an active time indication. For example, 1410 may be performed by indication component 1546 of apparatus 1502. The base station may transmit the active time indication to the at least one UE. The active time indication may indicate an active time for the at least one cell of the base station.

At 1412, the base station may transmit a scheduling grant for the at least one downlink resource occasion. For example, 1412 may be performed by resource component 1548 of apparatus 1502. The base station may transmit the scheduling grant to the at least one UE. Reception of part of the at least one downlink resource by the at least one UE may be scheduled while the at least one cell is in an active mode and in the inactive mode. In some aspects, the at least one UE may receive the at least one downlink resource. The at least one cell may remain in the active mode to allow for reception of the at least one downlink resource. In some aspects, the at least one UE may receive part of the at least one downlink resource that is scheduled during the active mode. For example, reception of the part of the at least one downlink resource scheduled during the inactive mode may be skipped by the at least one UE.

Figure 15:
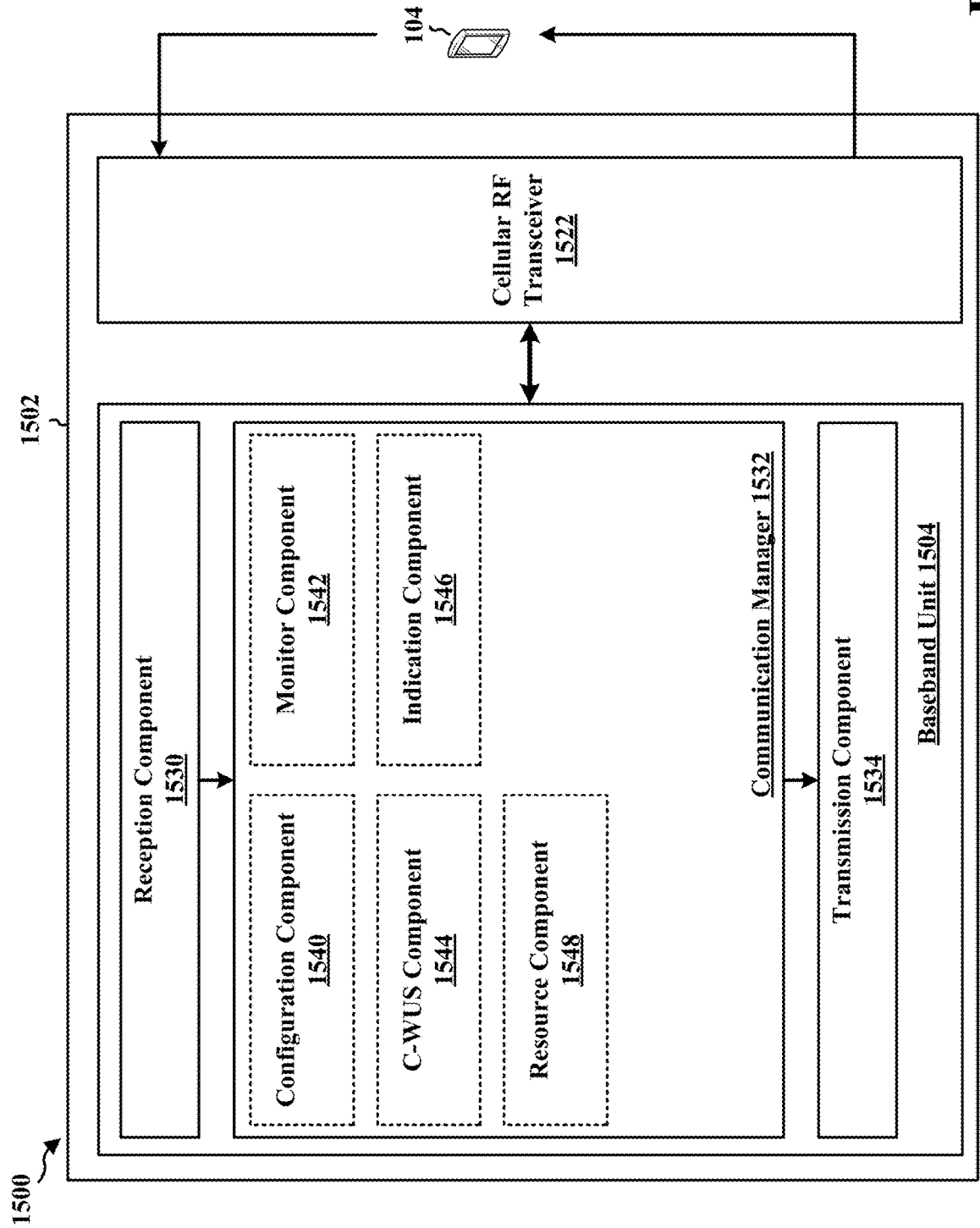
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a configuration component 1540 that may transmit a C-WUS configuration, e.g., as described in connection with 1302 of FIG. 13 or 1402 of FIG. 14. The configuration component 1540 may be configured to may transmit a sleep configuration, e.g., as described in connection with 1404 of FIG. 14. The communication manager 1532 further includes a monitor component 1542 that may monitor for at least a WUS from the at least one UE, e.g., as described in connection with 1304 of FIG. 13 or 1406 of FIG. 14. The communication manager 1532 further includes a C-WUS component 1544 that may receive a C-WUS to activate the at least one cell, e.g., as described in connection with 1408 of FIG. 14. The communication manager 1532 further includes an indication component 1546 that may transmit an active time indication, e.g., as described in connection with 1306 of FIG. 13 or 1410 of FIG. 14. The communication manager 1532 further includes a resource component 1548 that may transmit a scheduling grant for the at least one downlink resource occasion, e.g., as described in connection with 1412 of FIG. 14.

The apparatus may include additional components that perform each of the blocks of the algorithm in the flowcharts of FIG. 13 or 14. As such, each block in the flowcharts of FIG. 13 or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to at least one UE, a C-WUS configuration configuring the at least one UE to activate at least one cell of the base station from an inactive mode. The apparatus includes means for monitoring for at least a WUS from the at least one UE. At least one downlink resource occasion is scheduled for transmission to the at least one UE while the at least one cell is in the inactive mode. The apparatus includes means for transmitting, to the at least one UE, an active time indication indicating an active time for the at least one cell of the base station. The apparatus further includes means for transmitting, to the at least one UE, a sleep configuration configuring the UE to receive at least one downlink resource occasion while the at least one cell is in the inactive mode. The apparatus further includes means for transmitting a scheduling grant for the at least one downlink resource occasion. Reception of part of the at least one downlink resource by the at least one UE is scheduled while the at least one cell is in an active mode and in the inactive mode. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a C-WUS configuration configuring the UE to activate at least one cell of a base station from an inactive mode; monitor for at least a WUS occasion from the at least one cell of the base station in the inactive mode, wherein at least one downlink resource occasion is associated with the at least one cell in the inactive mode; and receive, from the base station, an active time indication indicating an active time for the at least one cell of the base station.

Aspect 2 is the apparatus of aspect 1, further including a transceiver coupled to the at least one processor.

Aspect 3 is the apparatus of any of aspects 1 and 2, further includes that the UE skips the reception of the at least one downlink resource occasion associated with the at least one cell in the inactive mode.

Aspect 4 is the apparatus of any of aspects 1-3, further includes that the UE receives each of the at least one downlink resource occasion associated with the at least one cell in the inactive mode.

Aspect 5 is the apparatus of any of aspects 1-4, further includes that the UE receives the at least one downlink resource occasion associated with the at least one cell in the inactive mode.

Aspect 6 is the apparatus of any of aspects 1-5, further includes that the at least one processor is further configured to receive, from the base station, a sleep configuration configuring the UE to receive at least one downlink resource occasion associated with the at least one cell in the inactive mode.

Aspect 7 is the apparatus of any of aspects 1-6, further includes that the at least one processor is further configured to receive a scheduling grant for at least one downlink resource occasion, wherein reception of part of at least one downlink resource is scheduled while the at least one cell is in an active mode and in the inactive mode.

Aspect 8 is the apparatus of any of aspects 1-7, further includes that the at least one processor is further configured to receive the at least one downlink resource, wherein the at least one cell remains in the active mode to allow for reception of the at least one downlink resource.

Aspect 9 is the apparatus of any of aspects 1-8, further includes that the at least one processor is further configured to receive part of the at least one downlink resource that is scheduled during the active mode, wherein reception of the part of the at least one downlink resource scheduled during the inactive mode is skipped.

Aspect 10 is the apparatus of any of aspects 1-9, further includes that the at least one downlink resource occasion comprises SPS PDSCH repetitions.

Aspect 11 is the apparatus of any of aspects 1-10, further includes that a first repetition in a first slot in a resource occasion is the first slot of the resource occasion.

Aspect 12 is the apparatus of any of aspects 1-11, further includes that a first repetition in a first slot in a resource occasion is the first slot that occurs within an active mode of the at least one cell of the base station.

Aspect 13 is the apparatus of any of aspects 1-12, further includes that the at least one processor is further configured to transmit, to the base station, a C-WUS to activate the at least one cell from the inactive mode to an active mode.

Aspect 14 is a method of wireless communication for implementing any of aspects 1-13.

Aspect 15 is an apparatus for wireless communication including means for implementing any of aspects 1-13.

Aspect 16 is a computer-readable medium storing computer executable code, where the code when executed by a processor causes the processor to implement any of aspects 1-13.

Aspect 17 is an apparatus for wireless communication at a base station including at least one processor coupled to a memory and configured to transmit, to at least one UE, a C-WUS configuration configuring the at least one UE to activate at least one cell of the base station from an inactive mode; monitor for at least a WUS from the at least one UE, wherein the at least one cell in the inactive mode associated with the base station having corresponding WUS occasions monitors for at least the WUS from the at least one UE; and transmit, to the at least one UE, an active time indication indicating an active time for the at least one cell of the base station.

Aspect 18 is the apparatus of aspect 17, further including a transceiver coupled to the at least one processor.

Aspect 19 is the apparatus of any of aspects 17 and 18, further includes that the at least one UE skips reception of at least one downlink resource occasion associated with the at least one cell in the inactive mode.

Aspect 20 is the apparatus of any of aspects 17-19, further includes that the at least one UE receives each of at least one downlink resource occasion associated with the at least one cell in the inactive mode.

Aspect 21 is the apparatus of any of aspects 17-20, further includes that the at least one UE receives at least one downlink resource occasion associated with the at least one cell in the inactive mode.

Aspect 22 is the apparatus of any of aspects 17-21, further includes that the at least one processor is further configured to transmit, to the at least one UE, a sleep configuration configuring the UE to receive at least one downlink resource occasion associated with the at least one cell in the inactive mode.

Aspect 23 is the apparatus of any of aspects 17-22, further includes that the at least one processor is further configured to transmit a scheduling grant for at least one downlink resource occasion, wherein reception of part of at least one downlink resource by the at least one UE is scheduled while the at least one cell is in an active mode and in the inactive mode.

Aspect 24 is the apparatus of any of aspects 17-23, further includes that the at least one UE receives the at least one downlink resource, wherein the at least one cell remains in the active mode to allow for reception of the at least one downlink resource.

Aspect 25 is the apparatus of any of aspects 17-24, further includes that the at least one UE receives part of the at least one downlink resource that is scheduled during the active mode, wherein reception of the part of the at least one downlink resource scheduled during the inactive mode is skipped.

Aspect 26 is the apparatus of any of aspects 17-24, further includes that the at least one downlink resource occasion comprises SPS PDSCH repetitions.

Aspect 27 is the apparatus of any of aspects 17-24, further includes that a first repetition in a first slot in a resource occasion is the first slot of the resource occasion.

Aspect 28 is the apparatus of any of aspects 17-25, further includes that a first repetition in a first slot in a resource occasion is the first slot that occurs within an active mode of the at least one cell of the base station.

Aspect 29 is the apparatus of any of aspects 17-26, further includes that the at least one processor is further configured to receive, from the at least one UE, a C-WUS to activate the at least one cell from the inactive mode to an active mode.

Aspect 30 is a method of wireless communication for implementing any of aspects 17-29.

Aspect 31 is an apparatus for wireless communication including means for implementing any of aspects 17-29.

Aspect 32 is a computer-readable medium storing computer executable code, where the code when executed by a processor causes the processor to implement any of aspects 17-29.

What is claimed is:

1. An apparatus for wireless communication at a user equipment (UE), comprising:

a memory; and
at least one processor coupled to the memory and configured to:
receive a cell wake up signal (C-WUS) configuration configuring the UE to activate at least one cell of a base station from an inactive mode;
monitor for at least a wake up signal (WUS) occasion from the at least one cell of the base station in the inactive mode, wherein at least one downlink resource occasion is associated with the at least one cell in the inactive mode, wherein the UE receives or skips reception of the at least one downlink resource occasion associated with the at least one cell in the inactive mode, wherein the at least one downlink resource occasion comprises semi-persistent scheduling (SPS) physical downlink shared channel (PDSCH) repetitions, wherein a first repetition in a first slot in a resource occasion is the first slot that occurs within an active mode of the at least one cell of the base station; and
receive, from the base station, an active time indication indicating an active time for the at least one cell of the base station.

2. The apparatus of claim 1, further comprising a transceiver coupled to the at least one processor.

3. The apparatus of claim 1, wherein the UE skips the reception of the at least one downlink resource occasion associated with the at least one cell in the inactive mode.

4. The apparatus of claim 1, wherein the UE receives each of the at least one downlink resource occasion associated with the at least one cell in the inactive mode.

5. The apparatus of claim 1, wherein the UE receives the at least one downlink resource occasion associated with the at least one cell in the inactive mode.

6. The apparatus of claim 1, wherein the at least one processor is further configured to:
receive, from the base station, a sleep configuration configuring the UE to receive the at least one downlink resource occasion associated with the at least one cell in the inactive mode.

7. The apparatus of claim 1, wherein the at least one processor is further configured to:
receive a scheduling grant for the at least one downlink resource occasion, wherein reception of part of at least one downlink resource is scheduled while the at least one cell is in an active mode and in the inactive mode.

8. The apparatus of claim 7, wherein the at least one processor is further configured to:
receive the at least one downlink resource, wherein the at least one cell remains in the active mode to allow for the reception of the at least one downlink resource.

9. The apparatus of claim 1, wherein the at least one processor is further configured to:
transmit, to the base station, a C-WUS to activate the at least one cell from the inactive mode to an active mode.

10. An apparatus for wireless communication at a user equipment (UE), comprising:
a memory; and
at least one processor coupled to the memory and configured to:
receive a cell wake up signal (C-WUS) configuration configuring the UE to activate at least one cell of a base station from an inactive mode;
monitor for at least a wake up signal (WUS) occasion from the at least one cell of the base station in the inactive mode, wherein at least one downlink resource occasion is associated with the at least one cell in the inactive mode;
receive, from the base station, an active time indication indicating an active time for the at least one cell of the base station;
receive a scheduling grant for the at least one downlink resource occasion, wherein reception of part of at least one downlink resource is scheduled while the at least one cell is in an active mode and in the inactive mode; and
receive part of the at least one downlink resource that is scheduled during the active mode, wherein the reception of the part of the at least one downlink resource scheduled during the inactive mode is skipped.

11. A method of wireless communication at a user equipment (UE), comprising:
receiving a cell wake up signal (C-WUS) configuration configuring the UE to activate at least one cell of a base station from an inactive mode;
monitoring for at least a wake up signal (WUS) occasion from the at least one cell of the base station in the inactive mode, wherein at least one downlink resource occasion is associated with the at least one cell in the inactive mode, wherein the UE receives or skips reception of the at least one downlink resource occasion associated with the at least one cell in the inactive mode, wherein the at least one downlink resource occasion comprises semi-persistent scheduling (SPS) physical downlink shared channel (PDSCH) repetitions, wherein a first repetition in a first slot in a resource occasion is the first slot that occurs within an active mode of the at least one cell of the base station; and
receiving, from the base station, an active time indication indicating an active time for the at least one cell of the base station.

12. The method of claim 11, further comprising:
receiving, from the base station, a sleep configuration configuring the UE to receive the at least one downlink resource occasion associated with the at least one cell in the inactive mode.

13. An apparatus for wireless communication at a base station, comprising:
a memory; and
at least one processor coupled to the memory and configured to:
transmit, to at least one user equipment (UE), a cell wake up signal (C-WUS) configuration configuring the at least one UE to activate at least one cell of the base station from an inactive mode;
monitor for at least a wake up signal (WUS) from the at least one UE, wherein the at least one cell in the inactive mode associated with the base station having corresponding WUS occasions monitors for at least the WUS from the at least one UE, wherein the at least one UE receives or skips reception of at least one downlink resource occasion associated with the at least one cell in the inactive mode, wherein the at least one downlink resource occasion comprises semi-persistent scheduling (SPS) physical downlink shared channel (PDSCH) repetitions, wherein a first repetition in a first slot in a resource occasion is the first slot that occurs within an active mode of the at least one cell of the base station; and transmit, to the at least one UE, an active time indication indicating an active time for the at least one cell of the base station.

14. The apparatus of claim 13, further comprising a transceiver coupled to the at least one processor.

15. The apparatus of claim 13, wherein the at least one UE skips the reception of the at least one downlink resource occasion associated with the at least one cell in the inactive mode.

16. The apparatus of claim 13, wherein the at least one UE receives each of the at least one downlink resource occasion associated with the at least one cell in the inactive mode.

17. The apparatus of claim 13, wherein the at least one UE receives the at least one downlink resource occasion associated with the at least one cell in the inactive mode.

18. The apparatus of claim 13, wherein the at least one processor is further configured to:
   transmit, to the at least one UE, a sleep configuration configuring the UE to receive the at least one downlink resource occasion associated with the at least one cell in the inactive mode.

19. The apparatus of claim 13, wherein the at least one processor is further configured to:
   transmit a scheduling grant for the at least one downlink resource occasion, wherein reception of part of at least one downlink resource by the at least one UE is scheduled while the at least one cell is in an active mode and in the inactive mode.

20. The apparatus of claim 19, wherein the at least one UE receives the at least one downlink resource, wherein the at least one cell remains in the active mode to allow for the reception of the at least one downlink resource.

21. The apparatus of claim 13, wherein the at least one processor is further configured to:
   receive, from the at least one UE, a C-WUS to activate the at least one cell from the inactive mode to an active mode.

22. An apparatus for wireless communication at a base station, comprising:
   a memory; and
   at least one processor coupled to the memory and configured to:
      transmit, to at least one user equipment (UE), a cell wake up signal (C-WUS) configuration configuring the at least one UE to activate at least one cell of the base station from an inactive mode;
      monitor for at least a wake up signal (WUS) from the at least one UE, wherein the at least one cell in the inactive mode associated with the base station having corresponding WUS occasions monitors for at least the WUS from the at least one UE;
      transmit, to the at least one UE, an active time indication indicating an active time for the at least one cell of the base station; and
      transmit a scheduling grant for at least one downlink resource occasion, wherein reception of part of at least one downlink resource by the at least one UE is scheduled while the at least one cell is in an active mode and in the inactive mode, wherein the at least one UE receives part of the at least one downlink resource that is scheduled during the active mode, wherein the reception of the part of the at least one downlink resource scheduled during the inactive mode is skipped.

23. The apparatus of claim 13, wherein the at least one downlink resource occasion associated with the at least one cell in the inactive mode comprises semi-persistent scheduling (SPS) physical downlink shared channel (PDSCH) repetitions.

24. The apparatus of claim 23, wherein a first repetition in a first slot in a resource occasion is the first slot of the resource occasion.

25. The apparatus of claim 23, wherein a first repetition in a first slot in a resource occasion is the first slot that occurs within an active mode of the at least one cell of the base station.

26. A method of wireless communication at a base station, comprising:
   transmitting, to at least one user equipment (UE), a cell wake up signal (C-WUS) configuration configuring the at least one UE to activate at least one cell of the base station from an inactive mode;
   monitoring for at least a wake up signal (WUS) from the at least one UE, wherein the at least one cell in the inactive mode associated with the base station having corresponding WUS occasions monitors for at least the WUS from the at least one UE, wherein the at least one UE receives or skips reception of at least one downlink resource occasion associated with the at least one cell in the inactive mode, wherein the at least one downlink resource occasion comprises semi-persistent scheduling (SPS) physical downlink shared channel (PDSCH) repetitions, wherein a first repetition in a first slot in a resource occasion is the first slot that occurs within an active mode of the at least one cell of the base station; and
   transmitting, to the at least one UE, an active time indication indicating an active time for the at least one cell of the base station.

27. The method of claim 26, further comprising:
   transmitting, to the at least one UE, a sleep configuration configuring the UE to receive the at least one downlink resource occasion associated with the at least one cell in the inactive mode.

* * * * *